(12) United States Patent
Zammarano et al.

(10) Patent No.: US 10,494,531 B2
(45) Date of Patent: Dec. 3, 2019

(54) FLAME RETARDANT COATINGS

(71) Applicants: Mauro Zammarano, Gaithersburg, MD (US); Douglas Fox, Reston, VA (US); Philipp Grützmacher, Rathsberg (DE); Rick Davis, Ijamsville, MD (US)

(72) Inventors: Mauro Zammarano, Gaithersburg, MD (US); Douglas Fox, Reston, VA (US); Philipp Grützmacher, Rathsberg (DE); Rick Davis, Ijamsville, MD (US)

(73) Assignee: AMERICAN UNIVERSITY, Washington, DC (US)

(*) Notice: Subject to any disclaimer, the term of this patent is extended or adjusted under 35 U.S.C. 154(b) by 92 days.

(21) Appl. No.: 15/602,340

(22) Filed: May 23, 2017

(65) Prior Publication Data
US 2017/0321068 A1 Nov. 9, 2017

Related U.S. Application Data

(62) Division of application No. 14/336,581, filed on Jul. 21, 2014, now Pat. No. 9,688,867.

(60) Provisional application No. 61/875,402, filed on Sep. 9, 2013.

(51) Int. Cl.
| | | |
|---|---|---|
| C09D 5/18 | (2006.01) | |
| C08K 3/28 | (2006.01) | |
| C08K 5/17 | (2006.01) | |
| C09D 165/00 | (2006.01) | |
| C08L 65/00 | (2006.01) | |
| C09D 7/63 | (2018.01) | |
| C08K 5/52 | (2006.01) | |

(52) U.S. Cl.
CPC ............ *C09D 5/18* (2013.01); *C08K 3/28* (2013.01); *C08K 5/17* (2013.01); *C08L 65/00* (2013.01); *C09D 165/00* (2013.01); *C08G 2261/3241* (2013.01); *C08G 2261/334* (2013.01); *C08G 2261/344* (2013.01); *C08G 2261/592* (2013.01); *C08K 5/52* (2013.01)

(58) Field of Classification Search
CPC ...... C09D 5/18; C09D 171/02; C09D 179/02; C09D 165/00; C08G 2261/344; C08G 2261/334; C08G 2261/3241; C08L 65/00
See application file for complete search history.

(56) References Cited

U.S. PATENT DOCUMENTS

| | | | |
|---|---|---|---|
| 5,760,106 A | 6/1998 | Pinnavaia | |
| 2012/0080378 A1 | 4/2012 | Revanur | |
| 2012/0205590 A1* | 8/2012 | Lee ..................... | C08G 61/124 |
| | | | 252/403 |

FOREIGN PATENT DOCUMENTS

CN  103127915 A  *  6/2013

OTHER PUBLICATIONS

Liebscher (Structure of Polydopamine: A Never-Ending Story? Langmuir, 2013, 29, pp. 10539-10548).*
Bernsmann (Dopamine-Melanin Film Deposition Depends on the Used Oxidant and Buffer Solution. Langmuir, 2011, 27, pp. 2819-2825).*
Yang (A Biomimetic Approach to Enhancing Interfacial Interactions: Polydopamine-Coated Clay as Reinforcement for Epoxy Resin. ACS App. Mater. Interfaces. 2011, 3, pp. 3026-3032).*
Machine translated English language equivalent of CN 103127915 (2013, 7 pages).*
Bourbigot, Serge, "Recent Advances for Intumescent Polymers," Marcromolecular Materials and Engineering, Jan. 7, 2004, 289, pp. 499-511, Wiley VCH.
Dreyer, Daniel R., "Elucidating the Structure of Poly(dopamine)," 2012, 28, pp. 6428-6435, Langmuir.
Horacek, Heinrich, "The Importance of Intumescent System Protection of Plastic Materials," Polymer International, 2000, 49, pp. 1106-1114, Society of Chemical Industry.
Lynge, Martin E., "Polydopamine—a nature-inspired polymer coating for biomedical science," Nanoscale, 2011, 3, pp. 4916-4928, The Royal Society of Chemistry.
Sedo, Joseph, "Catechol-Based Biometric Functional Materials," Advanced Materials, 2013, vol. 25, pp. 653-701, Wiley Library.
Tian, Ye, "Realizing Ultrahigh Modulus and High Strength of Macroscopic Graphene Oxide Papers Through Crosslinking of Mussel-Inspired Polymers," Advanced Materials, 2013, 25, pp. 2980-2983.
Waite, J. Herbert, "Mussel Power," Nature Materials, Jan. 2008, vol. 7, pp. 8-9, Nature Publishing Group.
Weil, Edward D. "Fire-Protective and Flame-Retardant Coatings—A State-of-the-Art Review," Journal of Fire Sciences, 2011, 29, pp. 259-296, SAGE.

* cited by examiner

*Primary Examiner* — Brieann R Johnston
(74) *Attorney, Agent, or Firm* — Thompson Hine L.L.P.

(57) ABSTRACT

A flame retardant coating composition comprising poly (dopamine) and either tris(hydroxymethyl)aminomethane) or gaseous ammonia, as well as an article comprising a substrate and the flame retardant coating composition, is provided. In various embodiments, the poly(dopamine) is substantially water insoluble. The coating composition can further comprise at least one additional component selected from the group consisting of melamine, an anionic clay, a phosphorus-containing compound, an amine-containing compound, aluminosilicates, silicon oxides, and combinations thereof. Also provided are methods for forming the flame retardant coating composition and methods for increasing flame retardant properties of a substrate.

11 Claims, 1 Drawing Sheet

FLAME RETARDANT COATINGS

This application is a Divisional of co-pending U.S. application Ser. No. 14/336,581 filed Jul. 21, 2014, which claims priority to U.S. Provisional Application Ser. No. 61/875,402 filed Sep. 9, 2013, each of which is expressly incorporated by reference herein in their entirety.

This invention was made with government support under Grant No. 60NANB11D174 awarded by NIST-BFRL Extramural Fire Research Grants Program. The government has certain rights in the invention.

TECHNICAL FIELD

The present application relates to coatings, and methods for preparing the coatings, which can be applied to a variety of surfaces and/or materials, the coatings providing a flame retardant function or characteristic to the surface and/or material. Specifically, in certain embodiments, the coatings are derived from biological materials, such as dopamine, phytic acid, and melamine.

BACKGROUND

Broadly defined, there are generally 5 main classes of flame retardants: metal oxides, hydroxides, and hydrates; halogens; (organo)phosphorus compounds; inorganic fillers; and intumescing materials. Regardless of the type of flame retardant, they generally follow one (or a combination) of three mechanisms for reducing fire hazards: vapor phase inhibition, solid phase char formation, and quenching/cooling.

For vapor phase inhibition materials, the flame retardant additive reacts with the burning material, such as a polymer, in the vapor phase. The vapor inhibition materials disrupt the production of free radicals at a molecular level and shut down the combustion process. This mechanism is commonly used with halogenated flame retardant systems. Char-forming flame retardant additives modify the decomposition pathway of the burning material by promoting the formation of a solid residue (char) on the material's surface and decreasing the amount of combustible volatiles. This char layer insulates the material, slowing pyrolysis, and creates a barrier that hinders the release of additional gases to fuel combustion. This method is commonly deployed by inorganic acids or acid precursors (e.g., phosphate salts) that induce crosslinking between, for example, polymer chains of the burning material. Nitrogen compounds, e.g. melamine, can be used in combination with phosphorous containing flame retardants to promote the formation of a porous char with enhanced thermal insulation and thermal stability through a synergistic mechanism observed when P—N bonds form prior to or during combustion.

Hydrated minerals are often used as halogen-free flame retardant systems commonly used for extruded applications like wire and cable. During combustion, the hydrated materials participate in an endothermic reaction to release water molecules that cool the burning material and dilute the combustion process.

The char forming mechanism can be enhanced by choosing compounds that intumesce. Intumescent compounds are insulating char forming materials that reduce heat and oxygen transport between the flame and unburned fuel source. In various embodiments, intumescent materials are comprised of (a) an acid source, which dehydrates, for example, a carbon source and/or the substrate, and is typically a phosphorus compound, such as ammonium polyphosphate, and (b) a carbonization agent or carbon source which chars during decomposition. Pentaerythritol and its derivatives have been most commonly used as a carbon source. The intumescent material may additionally comprise a blowing agent, which generates gas during decomposition. Blowing agents generally comprise a nitrogen compound. Melamine or urea have been used as blowing agents. In some embodiments, the blowing agent may be part of the acid and/or carbon source, for example, when the acid and/or carbon source contains N-containing groups, such as ammonium polyphosphate.

SUMMARY

In one aspect, a coating composition comprising poly(dopamine) and either tris(hydroxymethyl)aminomethane or gaseous ammonia is provided. In various embodiments, the poly(dopamine) is substantially water insoluble. The coating composition can further comprise at least one additional component selected from the group consisting of melamine, a cationic clay, a phosphorus-containing compound, sulfur-containing compound, an amine-containing compound, aluminosilicates, silicon oxides, and combinations thereof. In various embodiments, the coating composition is an intumescent composition.

In accordance with a particular aspect, an article comprising a substrate and the described coating composition is provided, where the substrate comprises glass, metal, wood, synthetic polymer, natural fiber, or other flammable and/or combustible material.

In accordance with another aspect, a method for preparing the coating composition is provided, comprising mixing dopamine with tris(hydroxymethyl)aminomethane at a pH greater than 7 or subjecting dopamine to gaseous ammonia under conditions to form poly(dopamine) comprising both water insoluble and water soluble fractions, and subjecting the formed poly(dopamine) to dialysis or centrifugation to remove substantially all the water soluble fraction.

Other aspects include methods for increasing flame retardant properties of a substrate, the method comprising either forming the coating composition and applying the coating composition to a substrate, or applying dopamine to a substrate, and subjecting the dopamine to an alkaline condition, under suitable conditions, to form a poly(dopamine) comprising water soluble and water insoluble fractions.

DETAILED DESCRIPTION

Figure 1A:
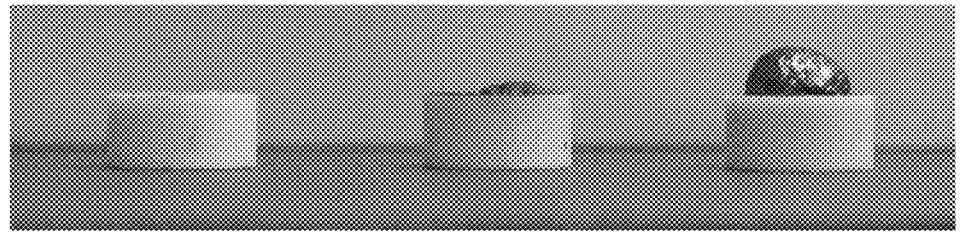
FIGS. 1A and 1B are pictures of the residues after microcombustion calorimeter for dopamine (DOPA) (left), AMPA (Center) and DOPA+AMPA on the right, with FIG. 1A a side view and FIG. 1B a top view.

The following detailed description will illustrate the general principles of the invention, embodiments of which are additionally provided in the accompanying examples.

Dopamine Polymerization

Dopamine (4-(2-aminoethyl)benzene-1,2-diol) (DOPA), when placed in an alkaline aqueous solution of about pH 8 to about 10, and particularly a pH of about 8.5, self-polymerizes and adheres to a wide variety of substrates, regardless of polarity, including inorganic materials, such as glass, minerals, etc., synthetic polymers, such as Teflon, polyethylene glycol (PEG), etc., and natural polymers, such as cellulose, chitosan, etc. In one embodiment, a composition comprising dopamine, and any additional components described, is polymerized using tris(hydroxymethyl)aminomethane (Tris) at an alkaline pH. In another embodiment, a composition comprising dopamine, and any additional components described, is polymerized using ammonia gas. The poly(dopamine) composition can be applied to a substrate to impart flame retardant characteristics onto the substrate.

Alternatively, dopamine, and optionally any of the described additional components, can be applied to the substrate and subsequently subjected to polymerization conditions. The adhesion of dopamine, during the polymerization process, to a substrate, is promoted by the formation of covalent bonds with the substrate, as well as other strong intermolecular interactions, such as hydrogen-bonding, metal chelation, and π-π interactions. In various embodiments, dopamine is combined with the substrate to be coated, and subjected to alkaline conditions to induce polymerization of the dopamine, as well as facilitating adhesion of the poly(dopamine) coating to the substrate. In additional embodiments, dopamine can be polymerized prior to coating the substrate, depending on the type of substrate to be rendered as a flame retardant. In various embodiments, the polymerized dopamine or the monomeric dopamine composition may contain additional components which facilitate adherence or binding or association of the poly(dopamine) and/or monomeric dopamine composition to the substrate. In one example, the poly(dopamine) contains a clay component.

There is significant debate over the exact mechanism of dopamine polymerization, but there are two well accepted models. In both cases, the alkaline solution oxidizes the dopamine to a mixture of 5,6-dihydroxyindoline and its dione derivative. In one model, these two oxidation products polymerize and cross-link through the formation of covalent bonds. In the other model, a supramolecular aggregate forms between the two oxidation products through strong intermolecular forces, including charge transfer, π-stacking, and hydrogen bonding. Both mechanisms may actually be occurring. A Tris-HCl-based buffer system has been used in dopamine polymerization reactions to achieve the desired alkaline condition. However, we have found that the formation of insoluble poly(dopamine) does not work when using a borate-based buffer at the same alkaline pH. The structure of tris(hydroxymethyl)aminomethane (Tris) contains the same end groups that are found in dopamine, —OH and —NH$_2$ groups. Without being held to a single theory, it is believed that tris(hydroxymethyl)aminomethane participates, or is incorporated, at some level, in the cross-linked structure of poly(dopamine).

Furthermore, we have found that poly(dopamine) actually consists of a water soluble and a water insoluble fraction, which can be separated by dialysis and/or centrifugation. It is likely that the insoluble fraction consists of covalently linked monomers. In various embodiments, monomeric dopamine, and any optional components, is applied to a substrate and subjected to alkaline conditions, to form the water soluble and water insoluble fractions of poly(dopamine), to coat and impart flame retardant characteristics to the substrate. The coated substrate may be washed to remove the water soluble fractions. In other embodiments where poly (dopamine) is first created and then applied to a substrate, the substantially water insoluble portion of the poly(dopamine) composition may be applied to the substrate. Alternatively, the poly(dopamine) composition containing both water soluble and insoluble portions can be applied to the substrate, and the water soluble portion can be subsequently washed off. In yet other embodiments, the water soluble portion of poly(dopamine) is not washed off.

In various embodiments, a substrate coated with the poly(dopamine) composition is subjected to a further drying step. In one embodiment, the coated substrate is dried between 50° C. and 150° C. for 1 hour to 24 hours. In one embodiment, the coated substrate is dried at ≥80° C. The maximum drying temperature is limited by the thermal stability of the substrate. For example, coating of polyurethane foam substrates which were dried for at least 2 hours and 80° C. or 90 minutes at 110° C. produced suitable results.

Poly(Dopamine) Flame Retardant

Whether the poly(dopamine) is formed through covalent polymerization or strong physical attraction, poly(dopamine) forms a durable layer that can entrap additional molecules. These entrapped additional molecules can serve a variety of purposes, as described below. We found that after polymerization of dopamine, the water insoluble fraction of the product exhibits the best properties in terms of fire resistance, compared to the water soluble fraction, as demonstrated by microcombustion calorimetry, where the water insoluble fraction had a much lower heat of combustion. The water insoluble fraction is likely formed by highly irreversibly, cross-linked structures comprising covalent bonds, and not formed by hydrogen-bonding, metal chelation, and π-π interactions. The poly(dopamine) structure is comprised of unsaturated carbons, nitrogen atoms, and oxygen atoms, all of which promote the formation of char when heated.

In addition, the use of an additional drying step of the coated substrate is thought to render the poly(dopamine) coating more durable and increase adhesion properties by thermal annealing of the polymer to the substrate.

In one aspect, a flame retardant coating comprising poly (dopamine) is provided, with its primary flame retardant mechanism being the formation of a char layer. As stated earlier, charring and char layer stability of the coating can be enhanced through the use of P—N synergies, addition of aluminosilicates (e.g. clay or talc), or addition of silicon oxides (e.g. glass or polyhedral oligomeric silsesquioxane). In one embodiment, the described poly(dopamine) coating is an intumescent material and in various embodiments, wherein the poly(dopamine) provides a carbon source which chars during decomposition, and at least one of an acid source which dehydrates the substrate and/or the carbon source. In various embodiments, the acid source is a phosphorus compound or a sulfur-containing compound. Additionally, the composition may comprise a blowing agent, such as a nitrogen containing compound, which generates gas during decomposition. In some embodiments, one or both the carbon source and/or acid source also provides blowing agent characteristics, for example, by containing nitrogen.

To enhance the formation of the char layer by the poly (dopamine) coating, the addition of phosphorus and nitrogen rich compounds, and clays may be included in the composition.

Melamine (MLM) is a compound readily derived from urea, a natural, biological compound, that has been shown to contribute to char formation, enhance intumescing behavior, and produce ammonia, which acts as an inert diluent which functions as a quenching mechanism. In various embodiments, melamine is included in the poly(dopamine) coating.

Sodium montmorillonite is a natural, expandable, anionic clay with exchangeable cations. Other suitable 2:1 exchangeable anionic clays include smectites, such as saponite, beidellite, or nontronite, illites, and vermiculite. Like most aluminosilicates, sodium montmorillonite typically enhances the structural integrity of char during combustion of a carbon source. In one embodiment, prior to the formation of poly(dopamine), the sodium of the sodium montmorillonite can be exchanged with dopamine under acidic conditions, which following application to a substrate and subsequent alkaline conditions, should allow for crosslinking, as described above, within the layers of clay, having the advantageous effect of expanding the layers of clay. Topical applications of clay, including layer-by-layer assembly, onto a substrate are typically non-durable and removed through simple washings. The subsequent cross-linking of dopamine may improve durability of clay coatings used as flame retardants. In various embodiments, the poly(dopamine) coating comprises sodium montmorillonite or proton-exchanged montmorillonite.

Aminomethylphosphonic acid (AMPA) contains both a phosphate and an amine group (nitrogen containing group), which should enhance char formation and integrity. AMPA may also participate in the crosslinking of dopamine, as described above, and can also be co-exchanged with dopamine in montmorillonite samples. Similarly, 2-aminoethylsulfonic acid (taurine) contains both a sulfate and an amine group, which behaves similarly to AMPA under fire conditions. It, too, may participate in dopamine crosslinking. In various embodiments, the poly(dopamine) coating comprises AMPA or taurine.

We have also investigated the use of phosphorylated and aminated carbohydrates, such as glucosamine, fructose-1,6-bisphosphate, inositol phosphates and glucosamine-6-phosphate (GA6P), as alternatives to melamine and AMPA, or as additional additives. Phytic acid and glucosamine-6-phosphate (GlcN6P) are particularly suitable for inclusion into the poly(dopamine) coating. Phytic acid, also referred to as inositol hexakisphosphate, is a naturally occurring compound that is the principal storage form of phosphorus in many plant tissues. The high phosphate content should enhance char formation and may also add vapor phase inhibition, as phosphorus compounds may act in both the condensed and vapor phases. Also, two of the phosphate groups in phytic acid are quite acidic, with a pK of about 1.6, which should improve intumescent behavior and char strength. Phytic acid can also readily phosphorylate natural fibers, such as cellulose as the substrate. In addition, phytic acid can be partially neutralized with an amine-containing base, such as urea, guanidine, or an amino acid, so that it may participate in the poly(dopamine) cross-linked structure as well as add a gas-forming agent to the formulation. In various embodiments, the additional phosphate groups promotes interactions between the poly(dopamine) composition and the substrate, such as by covalent bonds, such that the described flame retardant coating becomes more durable. In various embodiments, the poly(dopamine) coating comprises a phosphorylated and aminated carbohydrate.

Like AMPA, GlcN6P has an amine group and a phosphate group. As described above, the presence of both groups will enable exchange of components of clay, such as the counter cation sodium, by protonating the amine group and potentially generate P—N synergies in the described. In various embodiments, the poly(dopamine) coating comprises GlcN6P.

GA6P also contains three hydroxyl groups, so it may participate in the cross-linking of dopamine, similarly to Tris, as described above, and could potentially be phosphorylated by treatment with phosphoric acid.

Since all of the above described phosphates are acidic, they can be mixed with dopamine without the danger of premature polymerization that may occur with more basic organophosphates typically used as flame retardants, such as triphenylphosphate or tris(1,3-dichloro-2-propyl) phosphate.

In various embodiments, known flame retardant materials can be added to the described compositions. For example, halogenated sugars, such as Sucralose, urea, guanidinium phosphate, and/or melamine phosphate may be included in the described compositions.

Spot Flame Test

In one case, flexible polyether foams (PUF) were exposed to a butane torch flame to test fire resistance. Foams were first soaked in dopamine, dopamine-melamine, or dopamine-AMPA in water/methanol (50/50 by mass) solutions and squeezed to remove excess liquid. Dopamine or dopamine containing mixtures were cross-linked by moving the foam into a sealed container containing ammonium hydroxide at 40° C. Methanol helps swelling the foam to promote diffusion of dopamine into the foam and generate an interpenetrating network of a charring dopamine polymer in the foam. The first samples were soaked and sonicated for 1 hour to promote diffusion of dopamine. The sonication resulted in an 18% increase in mass due to enhanced liquid pick-up. These samples exhibited a very good flame retardant effect, with no collapse of the foam and flame extinguishment with a Bunsen burner. Sonication was not performed on subsequent samples and these samples did not show very good results in the scaled-up cone calorimeter test, where the foam collapsed. It is not believed that the lack of sonication is necessarily the reason for the different behavior, but the extent of cross-linking between dopamine molecules, the other additives in the coating, and the PUF was certainly a factor.

Horizontal Burn Test

Horizontal burn tests were conducted to evaluate flame spread on foam samples. A 4 cm propane flame was used as ignition source. The flame impinged for 6 s on the foam sample on one extremity; the other extremity of the sample was clamped to keep the sample horizontal. The foam samples had a length of 110 mm and a cross-section of 25 mm by 25 mm. In this example, foams were coated with a thin water-based spray coating of dopamine, AMPA, sodium montmorillonite (NaMT), or a combination of AMPA and NaMT (1:1 mass ratio) or dopamine and NaMT (1:1 mass ratio) using an oil spray bottle. The solid content was 10% by mass and the volume was 15 mL in all spray formulations. The sample treated with dopamine only was sprayed again 2 h after the first application with 15 mL solution containing 0.97 g of TRIS buffer. In all other samples the crosslinking in the dopamine was promoted by the other additives. All samples were dried at 50° C. for 12 hours. These formulation were water based and no methanol was used. Methanol based formulation might be preferred for promoting the diffusion of dopamine into PUF and potentially increase the effectiveness of the coating. The uptake of sprayed material was reasonably not homogeneous throughout the sample; the concentration decreased moving from the surface of the foam towards the core of the foam. The control foams (no coating) burned completely after application of the ignition flame. All AMPA coated foams, by itself or in combination with dopamine and NaMT, did not burn after the removal of the ignition flame. Sustained and complete combustion was eventually observed after multiple ignition flame impingements once the flame reached the unprotected foam core.

The coating visibly melted and sloughed off the surface of the foam during burning, failing to establish a protective char. The use of NaMT produced a much more viscous fluid prior to application and adhered better to the surface of the foam during burning. The exterior of the foam was clearly protected with a char layer, retaining the shape of the foam, though the interior of the foam continued to burn to completion.

Microcombustion Test

Microcombustion tests were conducted on a wide-range of coating mixtures to assess prevention of heat release and visibly observe extent of intumescence upon combustion. The data in Table 1 show a potential synergy between dopamine with Na-MT and between dopamine and MLM. Dopamine is typically cross-linked using a 10 mM Tris-HCl solution (sample DOPA+Tris-HCl*). We found that Tris-HCl promotes cross-linking not only because it stabilizes the pH around 8.5, but also because hydroxyl groups in Tris-HCl can likely react with dopamine (DOPA). DOPA can also react with hydroxyl groups in NaMT and amine groups of AMPA. When the sample DOPA+Tris-HCl* is washed to remove the soluble fraction of the product, the obtained product (DOPA+Tris-HCl*Insol) has a high cross-linking density as indicated by the high residue, low THR (total heat released), and low HRC (heat release capacity). The control sample which was not cross-linked (DOPA) produces significantly less char and a higher heat release than any of the samples cross-linked with Tris-HCl.

TABLE 1

Final residues, total heat evolved and heat release capacity measured by microcombustion calorimeter. The calculated theoretical data for a mixture based on the single components are shown in parenthesis.

| Sample ID | Residue (%) | THR (kJ/g) | HRC (kJ/g) |
| --- | --- | --- | --- |
| PUF | 0.3 | 25 | 510 |
| DOPA | 15.3 | 14.7 | 280 |
| DOPA + Tris-HCl* | 27 | 10.0 | 110 |
| DOPA + Tris-HCl* Insol | 58 | 1.1 | 13 |
| AMPA | 16.8 | 5.1 | 92 |
| AMPA1 + DOPA1 | 39.8 (32.1) | 9.2 (9.6) | 174 (186) |
| AMPA1 + Tris-HCl 1 | 16.3 (8.4) | 12.8 (11.3) | 150 (248) |
| Tris-HCl | 0.0 | 17.6 | 403 |
| MLM | 0.0 | 15.1 | 486 |
| DOPA1 + MLM | 19.3 (7.2) | 6.3 (14.9) | 128 (383) |
| DOPA1-NaMT 1 | 61.8 (51.1) | 2.9 (7.4) | 39 (140) |
| NaMT | 86.9 | 0 | 0 |
| DOPA1-AMPA1-NaMT 0.1 | 49.50 (19.4) | 5.9 (9.4) | 89 (177) |
| AMPA1-NaMT 1 | 72.0 (51.9) | 2.8 (2.6) | 52 (46) |
| MLM | 0 | 15.1 | 390 |
| DOPA1 + MLM1 | 19.3 (7.7) | 6.4 (14.9) | 128 (204) |

Figure 1B:
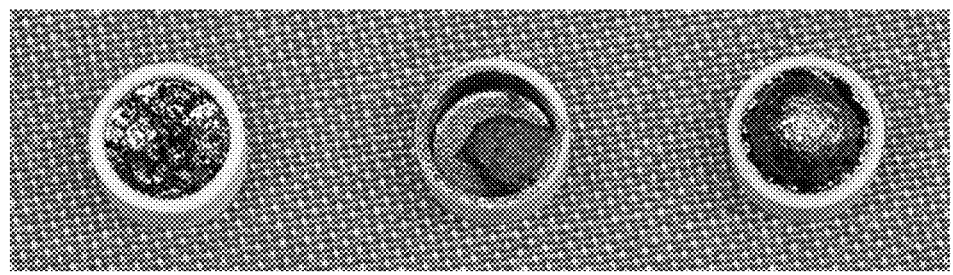

AMPA + DOPA is a 1/1 mass ratio of AMPA and DOPA.
AMPA1 + Tris-HCl 1 is a 1/1 mass ratio of AMPA and Tris-HCl
AMPA1-NaMT 1 is a 1/1 mass ratio of AMPA and NaMT
DOPA1-AMPA1-NaMT 0.1 is a 1/1/0.1 mass ratio between DOPA, AMPA and NaMT.
DOPA1 + MLM1 is a 1/1 mass ratio of DOPA and MLM.
DOPA + Tris-HCl* is a DOPA sample crosslinked in water with catalytical amount of Tris-HCl Comparison between the theoretical and observed microcombustion data indicates that the combination of melamine (MLM) and DOPA and the combination of DOPA and NaMT act synergistically to prevent combustion, as indicated by higher char and lower heat release. AMPA appears to act synergistically only when combined with DOPA and NaMT, and showed a 80% increase in organic content over the DOPA+NaMT test and only a slightly lower inhibition of combustion. It should be noted that the microcombustion calorimeter cannot capture physical effects on flammability like intumescence. FIGS. 1A and 1B show the residues of DOPA, AMPA and AMPA+DOPA. There is an obvious intumescence effect when DOPA and AMPA are combined together.

Microcombustion tests were also conducted on coated PUF samples. The foam samples were roughly cubic, measuring 5 mm per side and weighing 4 mg to 5 mg. In this example, foams were first soaked in dopamine, dopamine-AMPA, dopamine-phytic acid or dopamine-GlcN6P in water solutions and squeezed to remove excess liquid. The solutions may also have included proton-exchanged montmorillonite (HMT). The PUF samples were soaked and squeezed 3 times in a solution to promote uptake throughout the sample. The samples were cross-linked at room temperature in a chamber containing concentrated ammonia for 90 minutes, then dried at 90° C. for 2 h. The coating uptake after drying was 10% to 25% by mass. The control foams (no coating) burned completely during the microcombustion test. Most dopamine-AMPA-HMT coated foams and dopamine-GlcN6P-HMT coated foams, inhibited or prevented collapse of the foam structure. The formation of a stable foam-like residue is beneficial in terms of flammability reduction because it can act as a protective thermal insulating layer, capable to protect the underlying unburned foam in real scale burning.

Cone calorimeter tests were conducted on coated PUF samples. The foam samples measured 10 cm×10 cm×1 in and weighed 11 g to 12 g. In this example, foams were first soaked in dopamine-AMPA, dopamine-phytic acid or dopamine-urea phytate, monobasic in water solutions and squeezed to remove excess liquid. The solutions also included proton-exchanged montmorillonite (HMT). The PUF samples were soaked and squeezed 3 times in a solution to promote uptake throughout the sample. Three replicate samples were prepared from a single solution of a particular formulation. Some samples were cross-linked at room temperature in a chamber containing concentrated ammonia for 90 minutes, then dried at 90° C. for 2 h. Others were dried at 90° C. for 2 h, then cross-linked at room temperature in a chamber containing concentrated ammonia for 90 minutes. The coating uptake after drying was 20% to 25% by mass.

TABLE 2

Ignition times, heat release rates, and char as measured by cone calorimetry.

| Sample | $t_{ign}$ (s) | $t_{PHRR}$ (s) | PHRR (kW/m$^2$) | AHRR (kW/m$^2$) | THR (MJ/m$^2$) | $\Delta H_{comb}$ (MJ/kg) | Char (%) |
|---|---|---|---|---|---|---|---|
| Foam | 3.8 | 67.5 | 435 | 256 | 33.1 | 30.0 | 3.0 |
| DA-dx | 4.0 | 77.0 | 345 | 226 | 30.9 | 23.9 | 13.0 |
| DP-dx | 4.3 | 80.3 | 382 | 227 | 31.4 | 24.7 | 13.0 |
| DP-xd | 5.3 | 83.0 | 431 | 251 | 30.3 | 23.4 | 16.0 |
| DUP-xd | 4.5 | 83.0 | 373 | 205 | 30.6 | 23.5 | 14.9 |

DA-dx: DOPA/AMPA, dried then cross-linked
DP-dx: DOPA/Phytic acid, dried then cross-linked
DP-xd: DOPA/Phytic acid, cross-linked then dried
DUP-xd: DOPA/Urea phytate, monobasic, cross-linked then dried Dopamine based coating all delayed time to ignition and time to peak heat release rate while reducing the heat release rate and heat of combustion. Increased char yields approximately correlate with reductions in the heat of combustion. The most significant effects were on the delay of peak heat release and reduction in heat release rates. There was a slight reduction in total heat release. The presence of amine compounds, regardless of the phosphate source, resulted in the largest reductions in flammability. The order of drying and crosslinking had a significant effect on the cone data.

Figure 2:
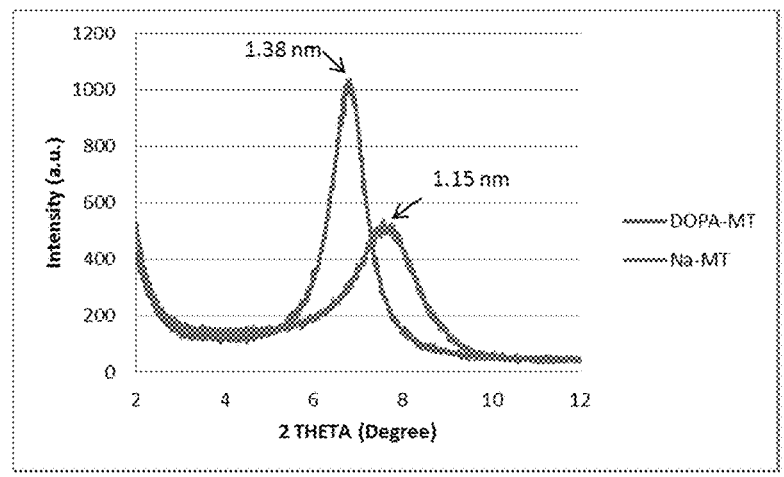
FIG. 2 shows x-ray analysis of a DOPA containing composition.

When Na-MT is also added to DOPA, a nanostructured material is obtained. In fact, as shown by x-ray analysis in FIG. 2, DOPA is capable of diffusing between the 1-nanometer-thick layers of Na-MT. The average distance between the clay layers increased from 1.15 nm to 1.38 nm. The same distance of about 1.4 nm (not shown) was observed also when AMPA was added to the formulation. Such nanostructures are capable of improving the mechanical strength of the material and reduce its permeability; all features that make the protective coating more effective.

The embodiments of this invention shown in the drawings and described above are exemplary of numerous embodiments that may be made within the scope of the appended claims.

What is claimed is:

1. A method for preparing a composition comprising poly(dopamine), the method comprising subjecting a composition comprising dopamine to a pH greater than 7 using ammonia gas and under conditions to form poly(dopamine) comprising both water insoluble and water soluble fractions, and subjecting the formed poly(dopamine) to dialysis or centrifugation to remove substantially all the water soluble fraction, wherein the composition further comprises at least one additional component selected from the group consisting of melamine, an anionic clay, aluminosilicates, silicon oxides, a phosphorus-containing compound, a sulfur-containing compound, and an amine-containing compound.

2. The method of claim 1 further comprising subjecting the formed poly(dopamine) to heating between 50° C. and 150° C. for 2 hours to 24 hours.

3. The method of claim 1 wherein the pH is 8.5.

4. A method for increasing flame retardant properties of a substrate, the method comprising
   applying a composition comprising dopamine to the substrate, and
   subjecting the dopamine to an alkaline condition using ammonia gas, under suitable conditions, to form a poly(dopamine) comprising water soluble and water insoluble fractions, to result in a flame retardant coated substrate.

5. The method of claim 4 further comprising adding at least one additional component to the substrate, the additional component selected from the group consisting of melamine, an anionic clay, aluminosilicates, silicon oxides, a phosphorus-containing compound, a sulfur-containing compound, and an amine-containing compound.

6. The method of claim 4 wherein the ammonia gas is generated from an ammonium hydroxide solution in a sealed container.

7. The method of claim 4 wherein the alkaline condition is a pH of 8.5.

8. The method of claim 4, further comprising removing the water soluble fraction.

9. The method of claim 4, wherein upon exposure of the substrate to a flame, the poly(dopamine) forms a char.

10. The method of claim 4 further comprising drying the flame retardant coated substrate at a temperature between 50° C. and 150° C. for a period of 1 hour to 24 hours.

11. The method of claim 10 wherein the temperature is ≥80° C.

* * * * *